(12) United States Patent
Kim et al.

(10) Patent No.: US 7,088,664 B2
(45) Date of Patent: Aug. 8, 2006

(54) REFLECTION TYPE COMPOUND PRISM AND OPTICAL PICKUP APPARATUS EMPLOYING THE SAME

(75) Inventors: Dae-sik Kim, Gyeonggi-do (KR);
Seung-tae Jung, Gyeonggi-do (KR);
Cheol-sung Yeon, Gyeonggi-do (KR);
Kun-ho Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 659 days.

(21) Appl. No.: 10/078,459

(22) Filed: Feb. 21, 2002

(65) Prior Publication Data
US 2002/0172133 A1 Nov. 21, 2002

(30) Foreign Application Priority Data
Apr. 30, 2001 (KR) ................................ 2001-23343

(51) Int. Cl.
*G11B 7/135* (2006.01)
(52) U.S. Cl. ............................. 369/112.19; 369/112.28; 369/112.21; 359/633; 359/834
(58) Field of Classification Search ............ 369/112.01, 369/112.19, 112.21, 112.28, 112.24, 53.28, 369/44.23; 359/633, 640, 637, 669, 834, 359/837
See application file for complete search history.

(56) References Cited

U.S. PATENT DOCUMENTS

| | | | |
|---|---|---|---|
| 4,783,589 A | 11/1988 | Ando | |
| 4,804,835 A | 2/1989 | Ando | |
| 4,822,150 A | 4/1989 | Duarte | |
| 5,200,946 A | 4/1993 | Fritz | |
| 5,218,596 A * | 6/1993 | Suzuki | 369/112.24 |
| 5,243,585 A | 9/1993 | Hoshino et al. | |
| 5,293,372 A * | 3/1994 | Hoshino et al. | 369/112.09 |
| 5,311,496 A * | 5/1994 | Whitehead | 369/112.21 |
| 5,317,556 A * | 5/1994 | Tsuboi et al. | 369/112.19 |

(Continued)

FOREIGN PATENT DOCUMENTS

DE 1 772 275 1/1970

(Continued)

OTHER PUBLICATIONS

Patent Abstracts of Japan, vol. 015, No. 016 (P-1152) Jan. 14, 1991, JP 02 260143, Oct. 22, 1990.

(Continued)

*Primary Examiner*—William Korzuch
*Assistant Examiner*—Kim-Kwok Chu
(74) *Attorney, Agent, or Firm*—Stein, McEwen & Bui, LLP

(57) ABSTRACT

A reflection type compound prism and an optical pickup apparatus employing the same. As a light beam is passed through the compound prism, a size of the light beam in a direction perpendicular to a reference plane is reduced by a first reflection surface, propagated toward an objective lens by second and third reflection surfaces and the size restored by reflecting the light beam from a fourth reflection surface forming an angle less than 45° with respect to the reference plane so that a height of an optical system is reducible to obtain a small thin optical pickup with a desired NA. The second and third reflection surfaces are spaced apart in a direction perpendicular to the reference plane by an amount close to a diameter of the light beam at a point of incidence of the light beam with the compound prism.

67 Claims, 5 Drawing Sheets

U.S. PATENT DOCUMENTS

| | | | |
|---|---|---|---|
| 5,517,480 A | 5/1996 | Matsuoka et al. | |
| 5,537,384 A * | 7/1996 | Lee et al. | 369/53.28 |
| 5,546,373 A | 8/1996 | Koyama | |
| 5,657,305 A * | 8/1997 | Sasaki et al. | 369/112.19 |
| 5,748,581 A * | 5/1998 | Kim | 369/44.23 |
| 5,751,482 A | 5/1998 | Challener, IV | |
| 6,198,574 B1 | 3/2001 | Hill | |
| 6,324,150 B1 * | 11/2001 | Ju | 369/112.19 |
| 6,650,469 B1 * | 11/2003 | Kim et al. | 359/363 |

FOREIGN PATENT DOCUMENTS

| | | |
|---|---|---|
| EP | 0 399 650 | 11/1990 |
| JP | 6-302005 | 10/1994 |
| JP | 7-21580 | 1/1995 |
| JP | 11-16195 | 1/1999 |
| JP | 11-134701 | 5/1999 |

OTHER PUBLICATIONS

Patent Abstracts of Japan, vo. 014, No. 465, Oct. 9, 1990, JP 02 185726, Jul. 20, 1990.

Office Action issued Apr. 4, 2006 re: Japanese Application No. 2002-48758 by the Japan Patent Office.

* cited by examiner

REFLECTION TYPE COMPOUND PRISM AND OPTICAL PICKUP APPARATUS EMPLOYING THE SAME

CROSS REFERENCE TO RELATED APPLICATIONS

This application claims the benefit of Korean Application No. 2001-23343 filed Apr. 30, 2001, in the Korean Patent Office, the disclosure of which is incorporated herein by reference.

BACKGROUND OF THE INVENTION

1. Field of the Invention

The present invention relates to a reflection type compound prism which reduces a height of an optical system, and a thin optical pickup apparatus employing the reflection type compound prism.

2. Description of the Related Art

Referring to FIG. 1, a conventional optical pickup apparatus has an optical system in which a light beam emitted from a light source 2 proceeds horizontally, is reflected by a reflection mirror 5 having a reflection surface 5a inclined by 45°, proceeds in a direction of a height h, and is condensed by an objective lens 3 to be focused on an optical disc 1.

A recording density of the optical disc 1 is determined by a size of a light spot formed by the objective lens 3 on a recording surface of the optical disc 1. The size of the light spot decreases as the wavelength of light used becomes shorter and an NA (numerical aperture) number of the objective lens 3 becomes greater. Assuming that an effective diameter and an effective focal length of a light beam input to the objective lens 3 are EPD and EFL, respectively, and an incident angle of a light beam focused on the recording surface of the optical disc 1 is $\theta$, NA=$\sin \theta$ and $\theta$=arctan$\{EPD/(2EFL)\}$. Thus, in order to maximize an effective NA number to minimize the size of a light spot under the above given circumstances, the light beam incident on the objective lens 3 should have a diameter corresponding to the effective diameter of the objective lens 3.

The thickness, in particular, the thickness in the direction of the height h, of the conventional optical pickup apparatus having the optical structure as shown in FIG. 1 is determined by the diameter of the light beam input to the objective lens 3, a thickness of the objective lens 3, the thickness in the direction of a height of an actuator (not shown) for driving the objective lens 3, a size of the reflection mirror 5, and an angle between the reflection mirror 5 and a horizontal plane which is perpendicular to the direction of height.

However, in the conventional optical pickup apparatus having the above structure, to increase the size of a light beam input to the objective lens 3 so as to obtain a desired NA number, the reflection mirror 5 must be made larger. Thus, it is difficult to manufacture a compact/thin optical pickup apparatus.

SUMMARY OF THE INVENTION

To solve the above-described problems, it is an object of the present invention to provide a reflection type compound prism which reduces a height of an optical system, and a thin optical pickup apparatus employing the same.

Additional objects and advantages of the invention will be set forth in part in the description which follows, and, in part, will be obvious from the description, or may be learned by practice of the invention.

To achieve the above and other objects of the invention, there is provided a reflection type compound prism comprising a plurality of prisms, which makes an incident light beam proceed by using a difference in angles between surfaces of the prisms, while a size of the incident light beam is reduced with respect to a predetermined direction, reflected by a surface forming an angle less than 45° with respect to a reference plane perpendicular to the predetermined direction, and exit in the predetermined direction.

Preferably, the plurality of prisms comprise a first prism comprising a first transmission surface and a first reflection surface which reflects an incident light beam so that the reflected light beam is inclined with respect to the horizontal plane, and a second prism comprising second and third reflection surfaces arranged close to a diameter of the light beam incident on the first transmission surface with respect to the predetermined direction by which an incident light beam reflected by the first reflection surface is reflected in order and a fourth reflection surface forming an angle less than 45° with respect to the horizontal plane by which an incident light beam reflected by the third reflection surface is reflected in the predetermined direction.

Preferably, the fourth reflection surface of the second prism forms an angle of 20° through 40° with respect to the horizontal plane.

Preferably, the second and third reflection surfaces of the second prism are parallel to each other.

Preferably, a third prism is provided between the first and second prisms to make a light beam reflected by the first reflection surface of the first prism proceed straight to the second prism.

Preferably, the first and second prisms are formed and arranged so that total internal reflection of an incident light beam occurs at the first through third reflection surfaces, and that the fourth reflection surface of the second prism is a total reflection surface.

To achieve the above and other objects of the invention, there is provided a reflection type compound prism comprising a first triangle prism having an isosceles triangle structure which is arranged to be inclined with respect to a reference plane perpendicular to a predetermined direction, and a rhomboid prism having a surface forming an angle less than 45° with respect to the reference plane.

Preferably, the reflection type compound prism further comprises a second triangle prism arranged between the first triangle prism and the rhomboid prism so that a light beam from the first triangle prism proceeds straight to the rhomboid prism.

Preferably, the second triangle prism has a right triangle structure.

Preferably, in the first triangle prism and the rhomboid prism, part of the surfaces by which a light beam is internally reflected are formed and arranged to produce total internal reflection.

Preferably, the rhomboid prism has a pair of parallel surfaces which are arranged according to the predetermined direction close to a diameter of a light beam incident on the first triangle prism.

To achieve the above and other objects of the invention, there is provided an optical pickup apparatus comprising a light source, an objective lens which forms a light spot on a recording surface of a recording medium by condensing an incident light beam emitted from the light source, an actuator which drives the objective lens in focus and/or track directions, a reflection type compound prism formed of a plurality of prisms through which an incident light beam emitted from the light source proceeds under the actuator while a size of the light beam is reduced with respect to a direction of height by using a difference in angles between surfaces of the prisms, is reflected by a surface forming an angle less than 45° with respect to a reference plane perpendicular to the direction of height, and proceeds to the objective lens disposed in the direction of height, and a photodetector which receives a light beam reflected by the recording medium and sequentially passed through the objective lens and the reflection type compound prism and photoelectrically converts the received light beam.

Preferably, the plurality of reflection type compound prisms comprise a first prism comprising a first transmission surface which transmits an incident light beam and a first reflection surface which reflects the transmitted light beam so that the reflected light beam is inclined with respect to the reference plane, and a second prism comprising second and third reflection surfaces spaced apart an amount close to a diameter of the light beam incident on the first transmission surface in a direction corresponding to the predetermined direction of height by which the light beam reflected by the first reflection surface is reflected in order and a fourth reflection surface which forms an angle less than 45° with respect to the reference plane by which the light beam reflected by the third reflection surface is reflected in the predetermined direction of height.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

Figure 1:
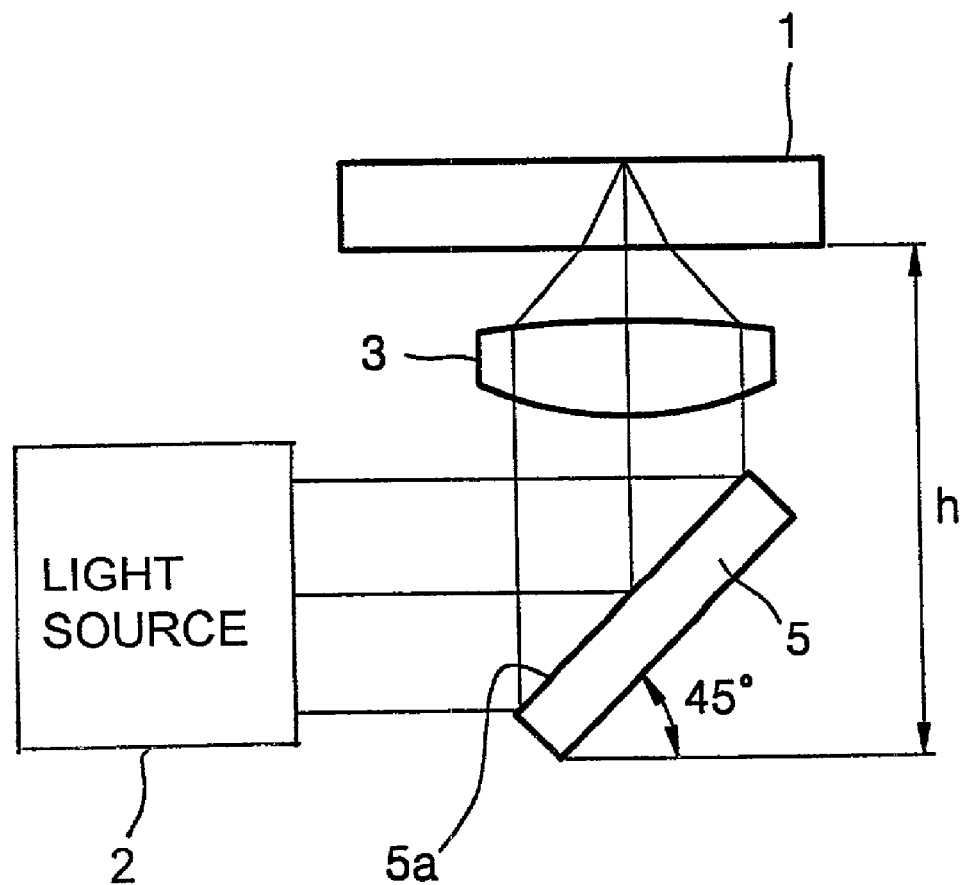
FIG. 1 is a view showing major portions of a conventional optical pickup apparatus.

Reference will now be made in detail to the present embodiments of the present invention, examples of which are illustrated in the accompanying drawings, wherein like reference numerals refer to like elements throughout.

Figure 2:
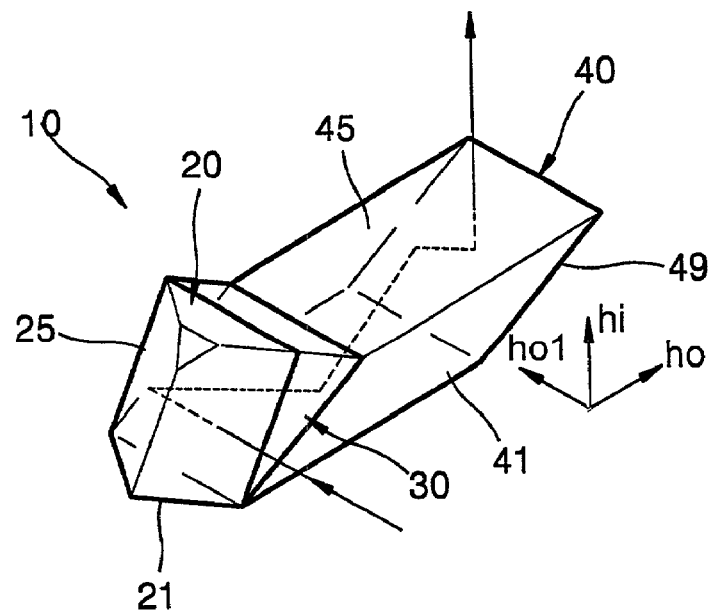
FIG. 2 is a perspective view of a reflection type compound prism according to the present invention.
Figure 3:
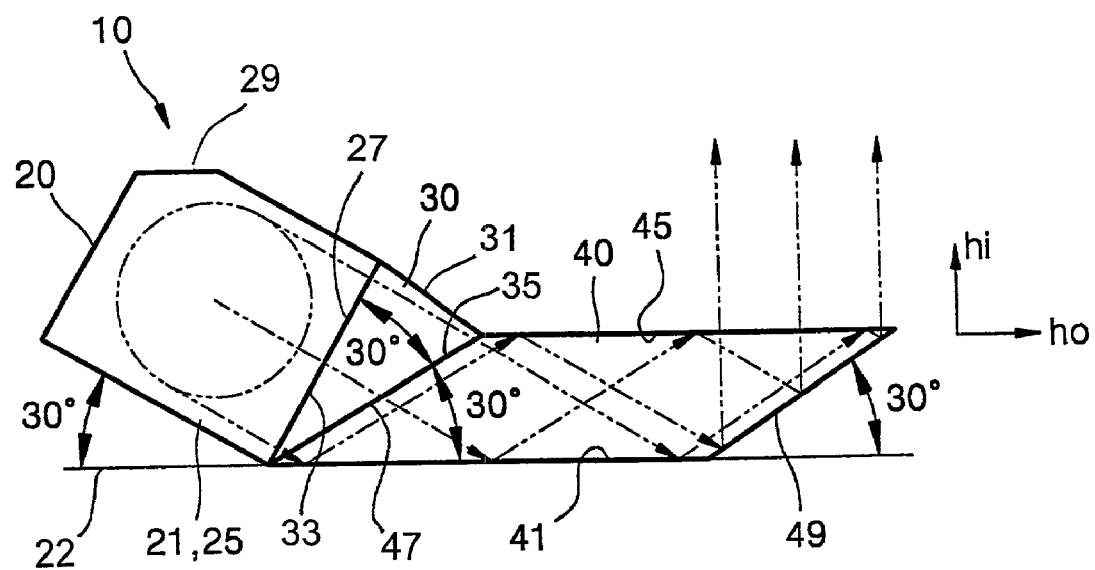
FIG. 3 is a view showing an example of conditions of angles in the reflection type compound prism according to the present invention.

Referring to FIGS. 2 and 3, a reflection type compound prism 10 according to the present invention comprises first and second prisms 20 and 40. A light beam output from a light source (not shown) substantially parallel to a reference plane (designated by ho and ho1 in FIG. 2), which is perpendicular to a direction of height hi of an optical system, is input to the first prism 20. The size of the light beam with respect to the direction of height hi is reduced by using a difference in an angle between surfaces of the first and second prisms 20 and 40. Then, the light beam is reflected by a surface 49 of the second prism 40 forming an angle less than 45° with respect to the reference plane, and is output in the direction of height hi.

Figure 4:
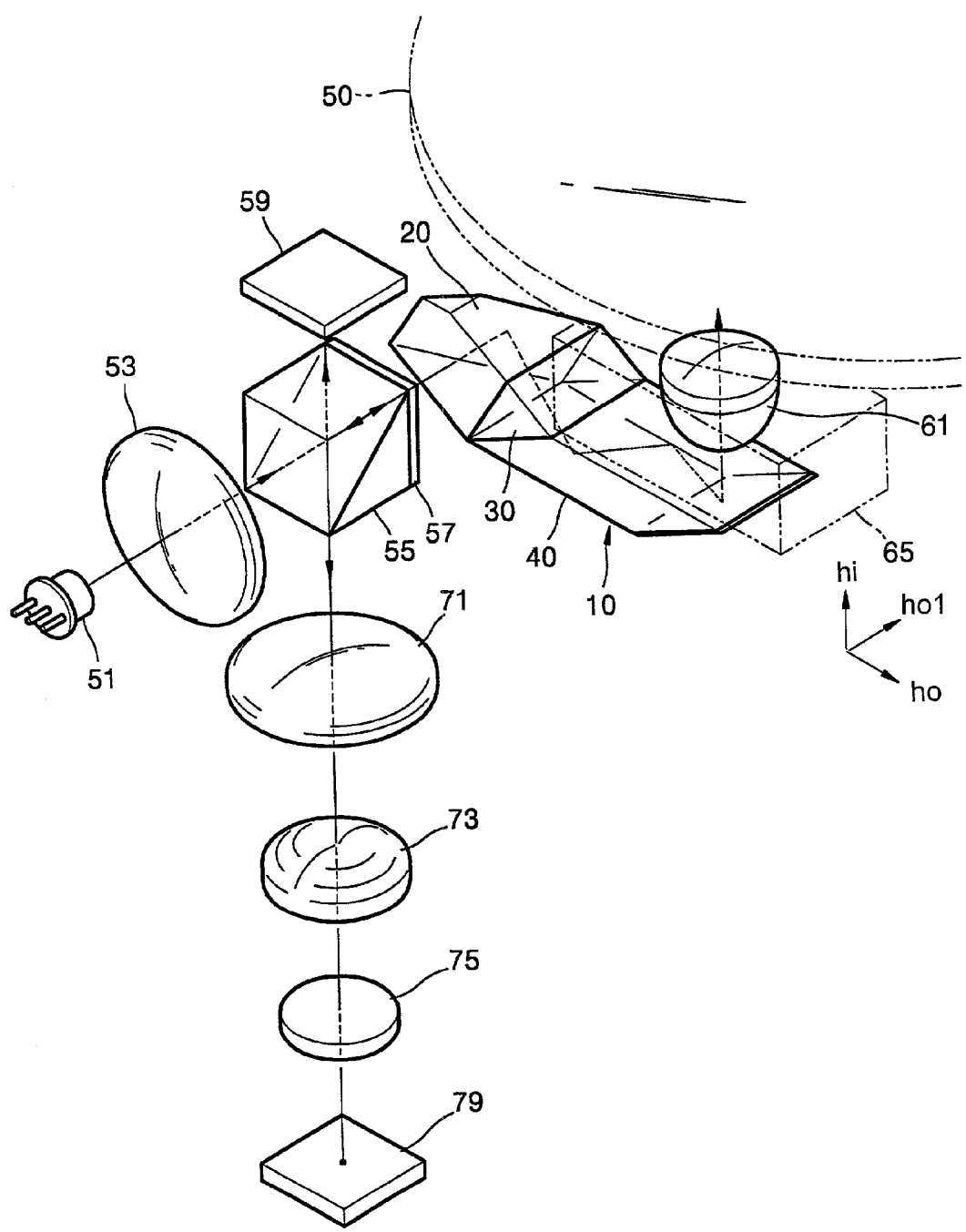
FIG. 4 is a perspective view of an optical pickup apparatus employing the reflection type compound prism according to the present invention.

Here, considering an example in which the reflection type compound prism 10 according to the present invention is adopted in an optical pickup apparatus, the direction of height hi of an optical system is assumed to indicate a direction along an optical axis of an objective lens 61 (FIG. 4). Of course, the direction of height hi may be different according to an optical system where the reflection type compound prism 10 according to the present invention is adopted. In FIG. 2, ho and ho1 denote the reference plane and ho and ho1 individually also denote predetermined directions parallel to the reference plane. An edge view of a plane parallel to the reference plane is denoted by 22 in FIG. 3.

The first prism 20 has a first transmission surface 21 and a first reflection surface 25 which reflects a light beam input through the first transmission surface 21 to be inclined with respect to the reference plane. The first prism 20 is preferably a triangle prism having an isosceles triangle structure. That is, the first prism 20 redirects the light beam by using three side surfaces—the first transmission surface 21, the first reflection surface 25, and a base surface 27 facing the second prism 40. The three side surfaces 21, 25 and 27 preferably form the isosceles triangle structure.

Preferably, a light beam from a light source 51 (see FIG. 6) is perpendicularly incident on the first transmission surface 21 and the first reflection surface 25 totally reflects the light beam incident through the first transmission surface 21.

Where a refractive index ni of material of the first prism 20 is 1.5 and a refractive index n2 of the outside of the first prism, that is, a refractive index of air, is 1, a critical incident angle θ at which total internal reflection occurs at the first reflection surface is 41.8°, which is obtained by using Equation 1.

$$\sin\theta = \frac{n2}{n1} \tag{1}$$

Thus, where the first prism 20, for example, is formed to have an isosceles right triangle structure, the angle at which a light beam perpendicularly transmitted through the first transmission surface 21 is incident on the first reflection surface 25 is 45°, so that the light beam is totally internally reflected by the first reflection surface 25.

As shown in FIG. 2, where the first prism 20 is formed to be a triangle prism having an isosceles triangle structure, the first prism 20 is preferably arranged so that the base 27 of the prism 20 is inclined a predetermined angle with respect to the reference plane so that the light beam totally internally reflected by the first reflection surface 25 is input to the second prism 40 at an angle meeting a condition for total internal reflection within the prism 40.

The second prism 40 comprises a second reflection surface 41 which totally internally reflects a light beam input into the second prism 40 in the hi direction after being reflected at the predetermined angle by the first reflection surface 25, a third reflection surface 45 which is arranged offset a predetermined distance from the second reflection surface 41 in the direction of height hi totally internally reflects a light beam passing the second reflection surface 41, and simultaneously is disposed at a position at which the size of the light beam in the direction of height hi is reduced, and a fourth reflection surface 49 which reflects the light beam input by being reflected by the third reflection surface 45 in the direction of height hi.

The distance between the second and third reflection surfaces 41 and 45 arranged to face each other is preferably smaller than a diameter of the light beam incident on the first transmission surface 21 of the first prism 20. By reducing the distance between the second and third reflection surfaces 41 and 45, a size of the light beam in the direction of height hi is reduced so that waveguiding parallel to the reference plane occurs. The fourth reflection surface 49 preferably forms an angle less than 45° with respect to the reference plane ho-ho1, preferably, 30±10°, (that is, within a range including 20° and 40°). Also, where an incident angle of the light beam incident on the fourth reflection surface 49 from the third reflection surface 45 does not meet a condition for total internal reflection due to the structure of the second prism 40, the fourth reflection surface 49 is preferably coated to be a reflective surface, preferably, a totally reflective surface.

In the present embodiment, the second prism 40 is preferably a rhomboid prism in which the second through fourth reflection surfaces 41, 45, and 49, and a surface 47 facing the fourth reflection surface 49 form a rhomboidal structure. Also, the first and second prisms 20 and 40 are preferably arranged and formed such that a light beam passing the first prism 20 and incident on the second reflection surface 41 of the second prism 40 is totally internally reflected and the light beam is also totally internally reflected at the third reflection surface 45.

Preferably, a third prism 30 is further provided between the first and second prisms 20 and 40 so that the inclined light beam reflected by the first reflection surface 25 of the first prism 20 proceeds straight to be input to the second prism 40. Here, the third prism 30 may be a triangle prism having a right triangle structure having a base surface 31, a height surface 33 and a hypotenuse surface 35.

As shown in FIG. 3, the base 27 of the first prism 20 forms an angle of 30° with respect to the reference plane 22. Thus, the first and second prisms 20 and 40 are arranged at an angle of 30° therebetween. The right triangle structure of the third prism 30 fits a gap between the first and second prisms 20 and 40. The fourth reflection surface 49 of the second prism 40 is formed at an angle of 30° with respect to the reference plane. In this case, since the first reflection surface 25 is inclined at an angle of 45° with respect to a light beam perpendicularly input to the first transmission surface 21 of the first prism 20, the light beam input to the first reflection surface 25 from the first transmission surface 21 is totally internally reflected and proceeds straight to be input to the second prism 40. The light beam entering the second prism 40 is inclined by 30° with respect to the second reflection surface 41, that is, at an incident angle of 60°. Thus, the incident light beam is totally internally reflected by the second reflection surface 41 to proceed toward the third reflection surface 45. The light beam is then incident on the third reflection surface 45 at an incident angle of 60° and is totally internally reflected to proceed toward the fourth reflection surface 49. Then, the light beam is incident on the fourth reflection surface 49 at an incident angle of 30° and is reflected in the direction of height hi.

Where the reflection type compound prism 10 according to the present invention meets the conditions of angles as shown in FIG. 3, a change in a diameter of a light beam in the reflection type compound prism 10 is as follows. For example, where an original diameter of a light beam input to the first transmission surface 21 is 3.2 mm, the diameter of the light beam incident on the second reflection surface 41 of the second prism 40 is double (6.4 mm) and the light beam is totally internally reflected. The light beam is then totally internally reflected from the third reflection surface 45 which is parallel to the second reflection surface 41, under the same conditions, and is then incident on the fourth reflection surface 49. Since the fourth reflection surface 49 is inclined by 30° with respect to the reference plane, the light beam is incident on the fourth reflection surface 49 at an incident angle of 30°. Accordingly, where reflected by the fourth reflection surface 49, the light beam regains its original diameter of 3.2 mm and proceeds in the direction of height hi. Thus, the diameter of the light beam is altered by reducing the diameter for transmission within the prism 40 and the diameter is restored for transmission through the reflective surface 45. Although surface 45 is referred to a reflective surface for convenience in describing propagation of light through the prism 40, it will be recognized by persons skilled in the art that surface 49 transmits rather than reflects light reflected by the fourth reflective surface 49.

That is, the reflection type compound prism 10 according to the present invention is formed such that a size of an exit light beam is not reduced with respect to a size of an input light beam at the first transmission surface 21.

Also, in the reflection type compound prism 10 according to the present invention, a light beam is incident on the second reflection surface 41 of the second prism 40 at an incident angle of 60°, which meets a condition for total reflection. Thus, by forming the distance between the second and third reflection surfaces 41 and 45 to be less than the diameter of the original light beam incident on the first transmission surface 21 of the first prism 20, and by forming respective widths in the ho1 direction of the second and third reflection surfaces 41 and 45 such that the light beam incident on the second prism 40 from the first prism 20 is incident on the fourth reflection surface 49 after being sequentially totally reflected by the second and third reflection surfaces 41 and 45, the light beam is reduced with respect to the direction of the height hi and propagates parallel to the reference plane.

Thus, the reflection type compound prism 10 according to the present invention reduces the height of an optical system in the direction hi. The embodiment of the reflection type compound prism 10 of the present invention described with reference to FIGS. 2 and 3 is exemplary and it is that various modifications will be readily apparent to persons skilled in the art in view of the disclosure herein. For example, although the reflection type compound prism 10 is described with reference to first, second and third prisms 20, 40, and 30, respectively, it will be understood that the reflection type compound prism 10 may be integrally formed of a common material wherein the surfaces 27, 33, 35 and 47 as shown in FIG. 3 are not physically identifiable features of the reflection type compound prism 10.

Figure 5:
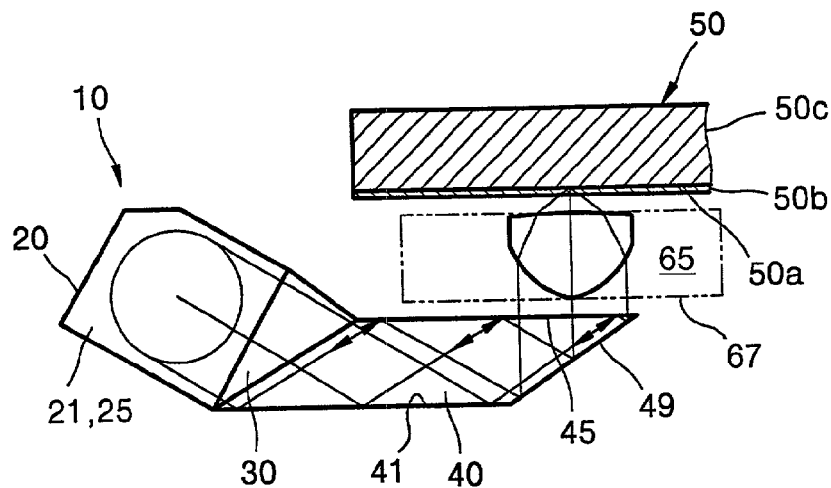
FIG. 5 is a view showing major portions of the optical pickup apparatus shown in FIG. 4.
Figure 6:
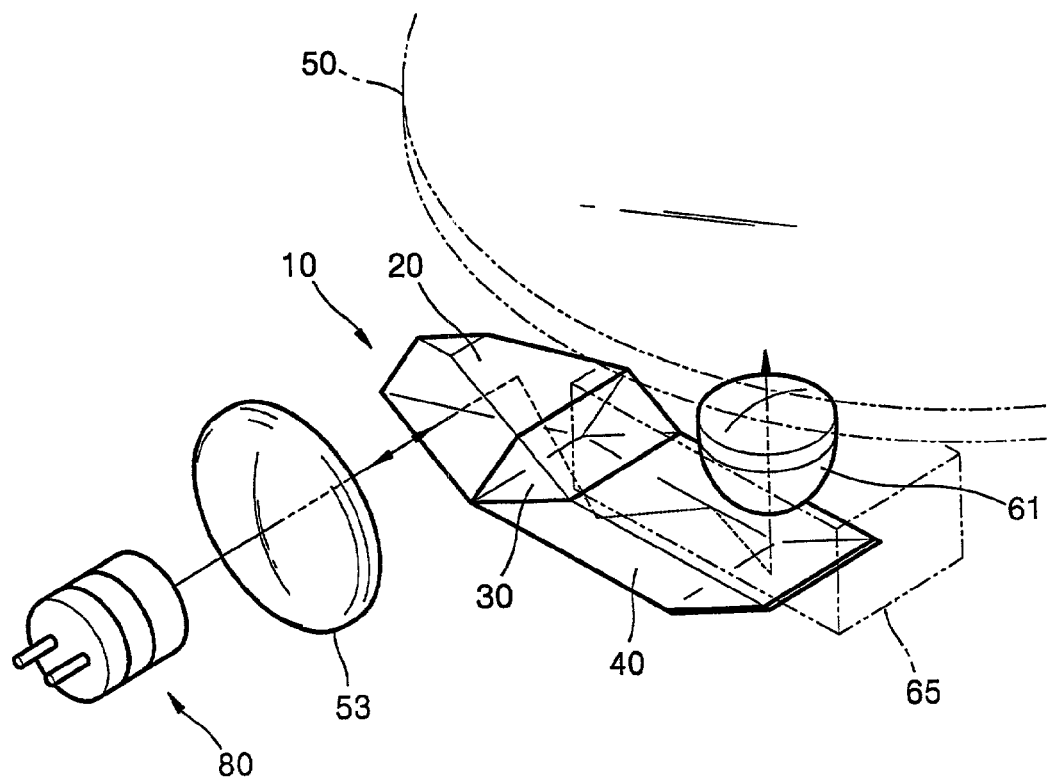
FIG. 6 is a perspective view of an optical pickup apparatus employing the reflection type compound prism according to another embodiment of the present invention.

Referring now to FIGS. 4, 5 and 6, various embodiments of an optical pickup apparatus adopting the reflection type compound prism 10 according to the present invention to form a thin optical system, will be described.

FIGS. 4, 5 and 6 show optical pickup apparatuses according to embodiments of the present invention which are applied to a recording medium 50 for recording/reproducing information signals in a first reflection surface recording method. These embodiments are exemplary and the optical pickup apparatus according to the present invention is not limited to the first reflection surface recording method. Here, the first reflection surface recording method is applied to the recording medium 50 wherein the recording medium 50 has no typical protective layer. A light beam from the optical pickup apparatus is incident on a recording surface 50a formed on a substrate 50c or a protective film 50b having a thickness of several μm, for example, 5 μm, formed on the recording surface 50a to protect the recording surface 50a from dust or scratches. The operational distance of an objective lens 61 is preferably made to be as short as the thickness of a typical protective layer, for example, a 0.6 mm thick substrate in a DVD, so that a thin optical pickup apparatus is achieved.

Referring to FIGS. 4 and 5, the optical pickup apparatus according to the present invention comprises a light source 51 which emits a light beam, an objective lens 61 which condenses the light beam emitted from the light source 51 to form a light spot on the recording surface 50a of the recording medium 50, an actuator 65 which drives the objective lens 61 in a focus and/or track direction, the reflection type compound prism 10, and a photodetector 79 which receives a light beam reflected by the recording medium 50 and which sequentially passes through the objective lens 61 and the reflection type compound prism 10 to detect an information signal and/or an error signal and which performs photoelectric conversion with respect to the received light beam.

Preferably, an edge emitting laser or a vertical cavity surface emitting semiconductor laser which emits a light beam having a wavelength of 650 nm or less is used as the light source 51.

The objective lens 61 preferably has an NA number of 0.6 or more and a working distance which is as short as possible, features which further contribute to forming a thin optical pickup apparatus. The objective lens 61 is controlled by the actuator 65 in the focusing and tracking directions. Since the basic structure of the actuator 65 is well known in the field to which the present invention pertains, a detailed explanation thereof will be not be provided herein.

The first, second and/or third prisms 20, 40, and/or 30 of the reflection type compound prism 10 is/are preferably optimized such that the size of a light beam output from the reflection type compound prism 10 is the same as or greater than that of the light beam emitted from the light source 51 and input to the reflection type compound prism 10, while simultaneously minimizing the thickness of the optical pickup apparatus.

For this purpose, the reflection type compound prism 10 has the structure described above with reference to FIGS. 2 and 3 and is arranged such that, where the light beam output from the light source 51 proceeds through the second prism located at a first end portion 67 of the actuator 65, its size is reduced in the direction of height hi by using a difference in angle between surfaces of the first and second prisms 20 and 40, and then the light beam is reflected to proceed toward the objective lens 61 disposed in the direction of height hi.

That is, the reflection type compound prism 10 has a structure in which an incident light beam is guided by reducing a size of the light beam in the direction of height hi between the second and third reflection surfaces 41 and 45 of the second prism 40. The first prism 20 of the reflection type compound prism 10 protrudes further in the direction of height hi than the third reflection surface 45 of the second prism 40. Thus, to form a thinner optical pickup apparatus, the reflection type compound prism 10 is preferably arranged such that only the second prism 40, in particular, a portion corresponding to the third reflection surface 45 of the second prism 40, is positioned close to first end portion 67 of the actuator 65. The actuator 65 is formed to accommodate the above arrangement. Where the second prism 40 is arranged as above, an effective thickness of the reflection type compound prism 10 which affects a thickness of the optical pickup apparatus is substantially the distance between the second and third reflection surfaces 41 and 45.

Here, considering that, preferably, the size of a light beam output from the reflection type compound prism 10 toward the objective lens 61 is substantially the same as or greater than that of the light beam incident on the reflection type compound prism 10, the thickness of the second prism 40 of the optimal reflection type compound prism 10 depends on an angle formed between the fourth reflection surface 49 and the second reflection surface 41. Thus, the thickness of the optical pickup apparatus in the direction of height hi is reducible according to a reduction in the angle formed between the fourth reflection surface 49 and the second reflection surface 41. As described above, where the reflection type compound prism 10 is formed as shown in FIG. 2, the angle of the fourth reflection surface 49 with respect to the second reflection surface 41 is adjustable within a range including 20° and 30°.

Where the reflection type compound prism 10 is adopted, a light beam having a relatively large diameter emitted from the light source 51 toward the reflection type compound prism 10 passes adjacent the first end portion 67 of the actuator 65 at a distance further from the recording surface 50a than at least a portion of the light beam which is incident on the first transmission surface 21. Further, the second transmission surface 41 is further from the recording surface 50a than all of the light beam which is incident on the first transmission surface 21. The original diameter of the light beam is restored where the light beam is reflected by the fourth reflection surface 49 of the second prism 40.

The optical pickup apparatus according to the present invention further includes an optical path changer which changes a proceeding path of a light beam on an optical path between the light source 51 and the reflection type compound prism 10. The optical path changer, as shown in FIG. 4, comprises a polarizing beam splitter 55 which transmits or reflects an incident light beam according to a polarization component of the incident beam, and a wave plate 57 which changes the polarization of the incident light beam. The wave plate 57 is preferably a quarter wave plate with respect to a wavelength of the light beam emitted from the light source 51. The beam splitter transmits and reflects the light beam in a predetermined ratio.

The optical pickup apparatus according to the present invention further comprises a collimating lens 53 which converges a divergent light beam emitted from the light source 51 into a parallel light beam on the optical path between the light source 51 and the reflection type compound prism 10. Where the collimating lens 53 and the beam splitter type optical path changer are arranged as shown in FIG. 4, a condensing lens 71 focuses a light beam which is reflected by the recording medium 50, sequentially passes through the objective lens 61, the reflection type compound prism 10, the optical path changer and proceeds toward the photodetector 79. The condensing lens 71 is provided on the optical path between the optical path changer and the photodetector 79. Also, to detect a focus error signal in an astigmatism method, an astigmatism lens unit comprising a cylindrical lens 73 which generates astigmatism and a yoke lens 75 which slightly diverges an incident light beam, may be further provided on the optical path between the optical path changer and the photodetector 79. Light emitted from the light source 51 is monitored by a monitoring photodetector 59.

Propagation of a light beam emitted from the light source 51 through the optical pickup apparatus according to the present invention will now be described with reference to FIGS. 4 and 5.

A light beam having a predetermined diameter emitted from the light source 51 and passing the collimating lens 53 and the optical path changer is perpendicularly incident on the first transmission surface 21 of the first prism 20 of the reflection type compound prism 10. The light beam is totally internally reflected by the first reflection surface 25 of the first prism 20 to proceed at an inclined angle with respect to the reference plane indicated by ho and ho1 in FIG. 4, and is incident on the second reflection surface 41 of the second prism 40 at an angle satisfying the condition for total internal reflection. The reference plane indicated by ho and ho1 is parallel to the second reflection surface 41.

The light beam is totally internally reflected by the second reflection surface 41 and the diameter of the light beam is enlarged. Then, the light beam is totally internally reflected by the third reflection surface 45 of the second prism 40 and proceeds toward the fourth reflection surface 49 of the second prism 40 which is reflectively coated to produce total reflection. The light beam is guided from the first prism through the second prism 40 in a direction parallel to the reference plane until the light beam meets the fourth reflection surface 49. At the fourth reflection surface 49, the diameter of the light beam increases relative to a size of the passage bounded by third and fourth reflective surfaces 41 and 45 through which the light beam propagates due to geometric structure of the second prism and mutual arrangement of the first and second prisms 20 and 40. The diameter of the light beam incident on the fourth reflection surface 49 forming an angle less than 45° with respect to the reference plane is restored to a size corresponding to the original size of the light beam incident on the first transmission surface 21 where the angle between the fifth reflective surface 49 and the reference plane is about 30° and the restored light beam is reflected toward the objective lens 61. Where the angle between the fifth reflective surface 49 and the reference plane is less than 30 degrees, the size of the light beam reflected toward the objective lens 61 is greater than the original size and where the angle between the fifth reflective surface 49 and the reference plane is greater than 30 degrees, the size of the light beam reflected toward the objective lens is less than the original size.

The light beam incident on the objective lens 61 is focused by the objective lens 61 to form a light spot on the recording surface 50a of the recording medium 50. The light beam is reflected by the recording surface 50a and passes back through the objective lens 61 and the reflection type compound prism 10, is incident on the optical path changer, and is reflected by the polarizing beam splitter 55 of the optical path changer. The reflected light beam is received by the photodetector 79 after passing through the condensing lens 71 and astigmatism lenses 73 and 75.

Although the optical pickup apparatus according to the above embodiment of the present invention is described with reference to FIGS. 4 and 5 to include the prism type optical path changer and the reflection type compound prism 10 having a structure so that an incident light beam is totally internally reflected by the first reflection surface 25 of the first prism 20, the prism type optical path changer 55 may be omitted by forming the reflection type compound prism 10 such that an incident light beam is transmitted and reflected by the first reflection surface 25 and by arranging the photodetector 79 and/or the monitoring photodetector 59 to detect the light beam passing through the first reflection surface 25.

Figure 7:
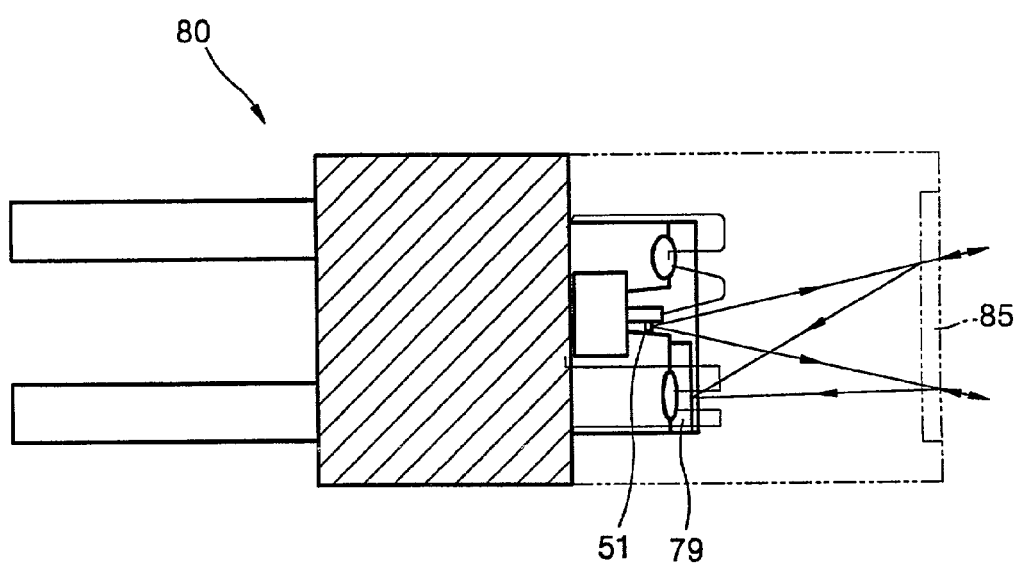
FIG. 7 is a view of an example of an optical module employed in the optical pickup apparatus of FIG. 6.

In an optical pickup apparatus according to another embodiment of the present invention, a hologram element 85 is used instead of the beam splitter type optical path changer. Where the hologram element 85 is adopted as the optical path changer, as shown in FIGS. 6 and 7, an optical module 80 includes the light source 51, the hologram element 85, and a photodetector 79. Here, the hologram element 85 is formed to selectively transmit or diffract and transmit light according to the direction from which a light beam is incident. For example, as shown in FIG. 7, the hologram element 85 transmits an incident light beam emitted from the light source 51 and diffracts and transmits an incident light beam reflected by the recording medium 50 so as to proceed toward the photodetector 79 arranged at one side of the light source 51. Since the light module 80 shown in FIG. 7 is well known in the field to which the present invention pertains, a detailed description thereof will be omitted.

Where the optical pickup apparatus according to the present invention adopts the optical module 80 as shown in FIG. 7, the optical pickup apparatus is made smaller than in the optical pickup apparatus having the optical structure shown in FIG. 4.

As described above, in the reflection type compound prism according to the present invention, a light beam emitted from the light source is guided, the size of the light beam according to the direction of the height is reduced, and the light beam is reflected by a surface forming an angle less than 45° with respect to the reference plane, so that the height of an optical system is reduced without reduction of the size of the light beam. Thus, where the reflection type compound prism is adopted, a light beam having a relatively large diameter incident on the reflection type compound prism from the light source passes under the actuator in a height lower than the top of the diameter of the light beam, and is reflected by the fourth reflection surface of the second prism so that the original diameter of the light beam is restored. Therefore, a small and thin optical pickup apparatus having a desired NA number is obtained.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A reflection type compound prism, comprising:
   a first prism which redirects a light beam from a first direction parallel to a reference plane to a second direction toward the reference plane, and
   a second prism which controls a size of the light beam by repeatedly reflecting the light beam internal to the second prism and redirects the light beam in a third direction perpendicular to the reference plane using a surface of the second prism forming an angle less than 45° with respect to the reference plane.

2. A reflection type compound prism comprising:
   a plurality of prisms which:
      propagate a light beam by using a difference in angles between surfaces of the prisms, and
      control a size of the light beam by reflecting the propagated light beam in a predetermined direction using a surface forming an angle less than 45° with respect to a reference plane, wherein the plurality of prisms comprise:
a first prism comprising a first surface which transmits the light beam and a second surface which reflects the light beam at an incline with respect to the reference, and
a second prism comprising:
third and fourth surfaces arranged spaced apart in the predetermined direction by a predetermined distance of about a diameter of the light beam incident on the first surface by which the light beam reflected by the first reflection surface is again reflected in order, and
a fifth surface which forms the angle less than 450 with respect to the reference plane and which further reflects the again reflected light beam in the predetermined direction.

3. The reflection type compound prism as claimed in claim 2, wherein the fifth surface forms an angle in a range including 20° and 40° with respect to the reference plane.

4. The reflection type compound prism as claimed in claim 3, wherein the second prism is a rhomboid prism comprising the third, fourth and fifth surfaces and a surface facing the fifth surface.

5. The reflection type compound prism as claimed in claim 2, wherein the third and fourth surfaces are parallel to each other.

6. The reflection type compound prism as claimed in claim 5, wherein the second prism is a rhomboid prism comprising the third, fourth and fifth surfaces and a surface facing the fifth surface.

7. The reflection type compound prism as claimed in claim 2, wherein the second prism is a rhomboid prism comprising the third, fourth and fifth surfaces and a surface facing the fifth surface.

8. The reflection type compound prism as claimed in claim 7, wherein the first and second prisms are formed and arranged so that total internal reflection of the light beam occurs at the second, third and fourth of the plurality of surfaces.

9. The reflection type compound prism as claimed in claim 2, further comprising a third prism disposed between the first and second prisms to make the light beam reflected by the second surface proceed straight to the second prism.

10. The reflection type compound prism as claimed in claim 9, wherein the third prism is a triangle prism having a right triangle structure.

11. The reflection type compound prism as claimed in claim 9, wherein the first and second prisms are formed and arranged so that total internal reflection of the light beam occurs at the second, third and fourth surfaces.

12. The reflection type compound prism as claimed in claim 2, wherein the first prism is a triangle prism having an isosceles triangle structure arranged to be inclined by a predetermined angle with respect to the reference plane.

13. The reflection type compound prism as claimed in claim 12, wherein the fifth surface is a total reflection surface.

14. The reflection type compound prism as claimed in claim 2, wherein the first and second prisms are formed and arranged so that total internal reflection of the light beam occurs at the second, third and fourth surfaces.

15. The reflection type compound prism as claimed in claim 2, wherein the fifth surface is a total reflection surface.

16. A reflection type compound prism comprising:
a first prism having an isosceles triangle structure which is arranged to be inclined with respect to a reference plane;
a second prism having a rhomboidal structure and a surface forming an angle less than 45° with respect to the reference plane; and
a third prism having a triangle structure arranged between the first prism and the second prism so that a light beam from the first prism proceeds straight to the second prism.

17. The reflection type compound prism as claimed in claim 16, wherein the third prism has a right triangle structure.

18. The reflection type compound prism as claimed in claim 16, wherein at least one surface in the first prism and at least one surface in the second prism, are formed and arranged to produce total internal reflection of the light beam.

19. The reflection type compound prism as claimed in claim 18, wherein the second prism has a pair of parallel surfaces which are spaced apart in a predetermined direction perpendicular to the reference plane.

20. The reflection type compound prism as claimed in claim 16, wherein the second prism has a pair of parallel surfaces which are spaced apart in a predetermined direction perpendicular to the reference plane.

21. An optical pickup apparatus comprising:
a light source which emits a light beam;
an objective lens which condenses light to form a light spot on a recording surface of a recording medium;
an actuator which drives the objective lens in focus and/or track directions;
a reflection type compound prism which:
reduces a size of the emitted light beam with respect to a first direction which is perpendicular to a reference plane by using a difference in angles between surfaces of the prism,
propagates the reduced size light beam adjacent the actuator, and
reflects the light beam in the first direction toward the objective lens using a surface forming an angle less than 45° with respect to the reference plane; and
a photodetector which photoelectrically converts the light beam reflected by the recording medium and passed through the objective lens and the reflection type compound prism.

22. The apparatus as claimed in claim 21, wherein the recording medium has a structure in which data is recorded on and/or reproduced from the recording medium in a reflection surface recording method.

23. The apparatus as claimed in claim 21, wherein the reflection type compound prism comprises:
a first prism comprising a first transmission surface which transmits the light beam and a first reflection surface which reflects the light beam so that the light beam is inclined with respect to the reference plane; and
a second prism comprising second and third reflection surfaces, spaced apart a distance of about a diameter of the light beam at the first transmission surface, which reflect the light beam to a fourth reflection surface forming an angle less than 45° with respect to the reference plane by which the light beam is reflected in the first direction toward the objective lens.

24. The apparatus as claimed in claim 23, wherein the fourth reflection surface forms an angle in the range including 20° and 40° with respect to the reference plane.

25. The apparatus as claimed in claim 23, wherein the second and third reflection surfaces are parallel to each other.

26. The apparatus as claimed in claim 23, wherein the second prism is a rhomboid prism in which the second, third and fourth reflection surfaces and a surface facing the fourth reflection surface form a rhomboidal structure.

27. The apparatus as claimed in claim 23, wherein the reflection type compound prism further comprises a third prism disposed between the first and second prisms to make a light beam reflected by the first reflection surface proceed straight into the second prism.

28. The apparatus as claimed in claim 27, wherein the third prism is a triangle prism having a right triangle structure.

29. The apparatus as claimed in claim 23, wherein the first prism is a triangle prism having an isosceles triangle structure arranged to be inclined by a predetermined angle with respect to the reference plane.

30. The apparatus as claimed in claim 23, wherein the first and second prisms are formed and arranged so that total internal reflection of the light beam occurs at the first, second and third reflection surfaces.

31. The apparatus as claimed in claim 23, wherein the fourth reflection surface is a total reflection surface.

32. The apparatus as claimed in claim 23, wherein the recording medium has a structure in which data is recorded on and/or reproduced from the recording medium in a reflection surface recording method.

33. The apparatus as claimed in claim 23, wherein at least a portion of the objective lens is disposed closer to the reference plane than a portion of the light beam at the first transmission surface.

34. The apparatus as claimed in claim 21, wherein the reflection type compound prism comprises:
a first prism having an isosceles triangle structure which is arranged to be inclined with respect to the reference plane; and
a second prism having a rhomboidal structure and a surface forming an angle less than 45° with respect to the reference plane.

35. The apparatus as claimed in claim 34, wherein the reflection type compound prism further comprises a third prism having a triangle structure arranged between the first prism and the second prism so that the light beam proceeds straight from the first triangle prism into the second prism.

36. The apparatus as claimed in claim 35, wherein the third prism has a right triangle structure.

37. The apparatus as claimed in claim 34, wherein in the first prism and the second prism, at least one surface is formed and arranged to produce total internal reflection of the light beam.

38. The apparatus as claimed in claim 37, wherein:
the second prism comprises a pair of parallel surfaces which are arranged spaced apart in a predetermined direction perpendicular to the reference plane by an amount close to a diameter of the light beam at an incident surface of the first prism.

39. The apparatus as claimed in claim 34, wherein:
the second prism comprises a pair of parallel surfaces which are arranged spaced apart in a predetermined direction perpendicular to the reference plane by an amount close to a diameter of the light beam at an incident surface of the first prism.

40. The apparatus as claimed in claim 34, wherein the recording medium has a structure in which data is recorded on and/or reproduced from the recording medium in a reflection surface recording method.

41. The apparatus as claimed in claim 34, wherein at least a portion of the objective lens is disposed closer to the reference plane than a portion of the light beam at an incident surface of the reflection type compound prism.

42. The apparatus as claimed in claim 21, wherein at least a portion of the objective lens is disposed closer to the reference plane than a portion of the light beam at an incident surface of the reflection type compound prism.

43. The apparatus as claimed in claim 21, further comprising an optical path changer, provided on an optical path between the light source and the reflection type compound prism, which changes a proceeding path of the light beam.

44. The apparatus as claimed in claim 43, wherein the optical path changer comprises:
a polarizing beam splitter which one of transmits and reflects an incident light beam according to a polarization of the incident light beam; and
a wave plate which changes the polarization of the incident light beam.

45. The apparatus as claimed in claim 43, wherein the optical path changer comprises a hologram element which selectively transmits or diffracts and transmits an incident light beam according to a direction of incidence, and the light source, the hologram element, and the photodetector are optically modularized.

46. An optical pickup for recording/reproducing a signal to/from a recording medium, the optical pickup comprising:
a light source which emits a light beam; and
a reflection type compound prism, which communicates the light beam toward the optical recording medium, the reflection type compound prism comprising:
a first surface which transmits the light beam,
a second surface which reflects the transmitted light beam to be inclined with respect to a reference plane and reduces a size of the transmitted light beam in a direction perpendicular to the reference plane,
third and fourth surfaces disposed parallel to the reference plane and which propagate the reduced size light beam by total internal reflection, and
a fifth surface which reflects the propagated reduced size light beam toward the optical recording medium and adjusts a size of the propagated reduced size light beam.

47. The optical pickup as claimed in claim 46, wherein the fifth surface adjusts the size of the propagated reduced size light beam to a size corresponding to a diameter of the light beam at the first surface.

48. The optical pickup as claimed in claim 46, wherein the fifth surface reflects the adjusted size light beam through the fourth surface and in a direction perpendicular to the reference plane.

49. The optical pickup as claimed in claim 48, wherein the fifth surface is disposed with respect to the reference plane at an angle in a range including 20 and 40 degrees.

50. The optical pickup as claimed in claim 46, further comprising an objective lens, disposed between the fourth surface and the optical recording medium.

51. The optical pickup as claimed in claim 46, wherein a portion of the first surface is closer to the optical recording medium than the fourth surface.

52. The optical pickup as claimed in claim 46, further comprising:
a photodetector which photoelectrically converts a light beam returned from the recording medium;
wherein the reflection type compound prism communicates the returned light beam toward the photodetector.

53. The optical pickup of claim 52, further comprising a beam splitter which transmits the emitted light beam toward the reflection type compound prism and reflects the returned light beam to the photodetector according to respective polarizations of the emitted and returned light beams.

54. The optical pickup of claim 53, wherein the isosceles triangle prism is truncated in height for at least a portion of a width of the isosceles triangle prism.

55. The optical pickup of claim 46, wherein:
the first and second surfaces are surfaces of an isosceles triangle prism and the isosceles triangle prism further comprises a base surface,
the third, fourth and fifth surfaces are surfaces of a rhomboid prism, the rhomboid prism further comprising a sloped surface parallel to the fifth surface, and
the reflection type compound prism further comprises a right triangle prism which joins the base surface of the isosceles triangle prism with the sloped surface of the rhomboid prism.

56. The optical pickup of claim 55, wherein:
the right triangle prism has a base surface, a height surface and a hypotenuse surface, the height surface of the right triangle prism joins the base surface of the isosceles triangle prism, and
the hypotenuse surface of the right triangle prism joins the sloped surface of the rhomboid prism.

57. The optical pickup of claim 56, wherein the base surface of the isosceles triangle prism makes an angle of about 60 degrees with the third surface.

58. The optical pickup of claim 56, wherein the hypotenuse surface of the right triangle prism makes an angle of 30 degrees with the third surface.

59. An optical pickup for recording/reproducing a signal to/from a recording medium, the optical pickup comprising:
a light source which emits a light beam; and
a compound prism, comprising:
a first surface,
a second surface, oriented at a first angle with respect to a first surface, which transmits the light beam,
a third surface oriented at a second angle with respect to the second surface and which reflects the light beam toward the first surface by total internal reflection,
a fourth surface, spaced apart from the first surface, which together with the first surface propagates the light beam by total internal reflection, and
a fifth surface, oriented at an angle in a range including 20 degrees and 40 degrees with respect to the first surface, which reflects the propagated light beam toward the optical recording medium.

60. The optical pickup as claimed in claim 59, wherein the first and fourth surfaces are parallel.

61. An optical pickup for recording/reproducing a signal to/from a recording medium, the optical pickup comprising:
an objective lens;
a light source which emits a light beam; and
a reflection type compound prism, comprising:
a first prism redirecting the light beam from a first direction parallel to a reference plane to a second direction toward the reference plane, and
a second prism controlling a size of the light beam emitted toward the objective lens by repeatedly reflecting the light beam internal to the second prism and redirecting the light beam in a third direction perpendicular to the reference plane using a face of the second prism forming an angle less than 45° with respect to the reference plane.

62. The optical pickup of claim 61 wherein the angle less than 45 degrees has a value of about 20 to about 40 degrees.

63. The optical pickup of claim 61, wherein the first direction and the third direction are perpendicular.

64. The optical pickup of claim 61, further comprising a third prism which optically connects the first and second prisms so that a direction of light traveling in the second direction is not altered at adjoining surfaces of the first and second prisms.

65. The optical pickup of claim 64, wherein:
the first prism has an isosceles triangle structure,
the second prism has a rhomboid structure having at least first and second faces, the first face of the rhomboid structure corresponds to the face forming the angle less than 45° with respect to the reference plane, and
the third prism has a right triangle structure.

66. The optical pickup of claim 65, wherein:
the light beam is received from the light source along one equal face of the isosceles triangle structure and internally reflected from another equal face of the isosceles triangle structure,
a base of the isosceles triangle structure communicates the light beam to a base face of the right triangle structure;
a hypotenuse face of the right triangle structure communicates the light beam to the second face of the rhomboid structure; and
the light is emitted toward the objective lens through the first face of the rhomboid structure.

67. The optical pickup of claim 66, wherein the first face of the rhomboid structure is optically coated so that the first face of the rhomboid structure is totally reflective.

* * * * *

UNITED STATES PATENT AND TRADEMARK OFFICE
CERTIFICATE OF CORRECTION

PATENT NO. : 7,088,664 B2 Page 1 of 1
APPLICATION NO. : 10/078459
DATED : August 8, 2006
INVENTOR(S) : Dae-sik Kim et al.

It is certified that error appears in the above-identified patent and that said Letters Patent is hereby corrected as shown below:

Column 11, Line 13
change "450" to --45°--

Column 11, Line 66
change ":" to --;--

Signed and Sealed this

Thirty-first Day of July, 2007

JON W. DUDAS
*Director of the United States Patent and Trademark Office*